United States Patent [19]

Lamerant

[11] Patent Number: 5,424,050
[45] Date of Patent: Jun. 13, 1995

[54] PROCESS FOR EXTRACTING GALLIUM FROM BAYER LIQUORS USING AN IMPREGNATED ABSORBENT RESIN

[75] Inventor: Jean-Michel Lamerant, Bouc Bel Air, France

[73] Assignee: Rhone-Poulenc Chimie, Courbevoie Cedex, France

[21] Appl. No.: 50,721

[22] Filed: Apr. 13, 1993

Related U.S. Application Data

[63] Continuation of Ser. No. 924,461, Aug. 4, 1992, abandoned, which is a continuation of Ser. No. 729,907, Jul. 15, 1991, abandoned, which is a continuation of Ser. No. 403,785, Sep. 6, 1989, abandoned, which is a continuation of Ser. No. 109,171, Oct. 16, 1987, abandoned.

[30] Foreign Application Priority Data

Oct. 24, 1986 [FR]  France .................. 86 15362

[51] Int. Cl.$^6$ ............................. C22B 58/00
[52] U.S. Cl. ..................... 423/112; 423/DIG. 14
[58] Field of Search ............ 423/112, DIG. 14; 210/668, 661, 670, 679, 656, 688, 634

[56] References Cited

U.S. PATENT DOCUMENTS

| | | | |
|---|---|---|---|
| 3,637,711 | 1/1972 | Budde, Jr. et al. | 260/289 |
| 4,220,726 | 9/1980 | Warshawsky | 423/100 |
| 4,631,177 | 12/1986 | Yotsuyanagi et al. | 423/112 |
| 4,865,823 | 9/1989 | Minagawa et al. | 423/112 |
| 5,102,512 | 4/1992 | Lamerant | 204/105 R |

FOREIGN PATENT DOCUMENTS 0285055 10/1988 European Pat. Off. .
0054461 6/1982 France .
62-211332 9/1987 Japan .

OTHER PUBLICATIONS

Chemical Abstracts, vol. 99: 6483a p. 6486 (1983).
Macroporous Resins as Supports for a Chelating Liquid Ion Exchanger (Parish Analytical Chem. vol. 49 Jul. 1977).
Chemical Abstracts vol. 110 : 215653r p. 168 (1989).

*Primary Examiner*—Steven Bos
*Attorney, Agent, or Firm*—Burns, Doane, Swecker & Mathis

[57] ABSTRACT

The invention also relates to a method of recovering the gallium contained in an aqueous solution of strongly alkaline sodium aluminate by chemical exchange between a stationary phase consisting of a microporous adsorbent resin impregnated with 7-(alkyl or alkenyl)-8-hydroxyquinoline and the aqueous phsae of sodium aluminate. According to the invention, the dry resin prior to its impregnation has a specific surface area measured by the BET method which is at least equal to 450 sq.m/g of resin, a pore volume at least equal to 1500 cu.mm/g of resin, a mean pore diameter comprised between 80 and 500 Å with at least 80% of this volume consisting of pores with a diameter comprised between 40 and 5000 Å, a rate of expansion of swelling in an aqueous medium which does not exceed 20% and in that it is impregnated with 7-(alkyl or alkenyl)-8-hydroxyquinoline in the proportion of 250 to 350 g/liter of dry resin.

23 Claims, No Drawings

PROCESS FOR EXTRACTING GALLIUM FROM BAYER LIQUORS USING AN IMPREGNATED ABSORBENT RESIN

This application is a continuation of application Ser. No. 07/924,461, filed Aug. 4, 1992, now abandoned, which is a continuation of Ser. No. 07/729,907, filed on Jul. 15, 1991, now abandoned, which is a continuation of Ser. No. 07/403,785, filed on Sep. 6, 1989, now abandoned, which is a continuation of Ser. No. 07/109,171, filed on Oct. 16, 1987, now abandoned.

BACKGROUND OF THE INVENTION

1. Field of the Invention The present invention relates to methods for extracting gallium from gallium containing solutions.

2. Discussion of the Background

Gallium is known for its low melting temperature, making it possible to produce alloys having a low melting point. Gallium has for some years been the object of considerably regained interest in particular because of the development of gallium arsenide for the electronics industry. This material is preferred to silicon as a semiconductor in certain quite specific applications.

At the present time, a considerable part of the available gallium is obtained from Bayer liquors which are solutions of sodium aluminate resulting from the sodium hydroxide attack on bauxite. The Bayer process is a well-known process in the manufacture of aluminum trihydrate. However, despite the relatively high content of 200 to 600 mg gallium per liter of liquor in these solutions, the presence of large quantitites of aluminum makes it difficult to selectively recover gallium therefrom. The chemical properties of aluminum and gallium are very closely related. Other impurities which are soluble in a highly alkaline medium further exacerbate the problem. These are, e.g., vanadate, zincate, ferrate, molybdate.

Electrolysis over a mercury cathode has been the only process used when the quantitites of gallium to be extracted were small. But with the increasing need for this material and the problems posed by handling large quantities of mercury, there has been a movement towards liquid/liquid extraction processes, particularly those using 8-hydroxyquinoline, also known as oxine. The complex of oxine with gallium has the advantageous characteristic of being only soluble in chlorinated solvents.

Substantial progress in the development of these processes has been achieved with the appearance on the market of 8-hydroxyquinolines substituted in the seventh position, generally referred to by the term 7-(alkyl or alkenyl)-8-hydroxyquinoline, particularly those manufactured by ASHLAND OIL CO. (U.S. Pat. No. 3,637,711). This group of gallium complexing agents makes it possible to use non-chlorinated solvents.

At the same time, the problems of improving the kinetics of liquid/liquid extraction of gallium has been studied by RHONE-POULENC CO. For example, significant progress has been made by increasing the exchange surface areas between the extraction agent 7-alkenyl-8-hydroxyquinoline and the alkaline solution containing the gallium by the formation of a microemulsion (EP 0102280 and EP 0102882).

However, because considerable volumes of extraction agent and solvent are involved in this liquid/liquid extraction process and these have to be regenerated to make this extraction of gallium contained in the Bayer liquor industrially feasible, several schemes have been undertaken to extract the gallium with ion exchange resins. For instance, SUMITOMO CHEMICAL CO. has suggested extracting gallium with a resin comprising as an active group an amide-oxime function. Although apparently more appealing than liquid/liquid extraction, this process has proved to be very difficult to carry out because of the fragility of the amide-oxime groups and because the resin degrades during the successive elution cycles with an acid medium to release the gallium fixed onto the resin.

MITSUBISHI CHEMICAL INDUSTRY CO., in a Japanese Kokai patent application 60 42234/85 corresponding to Derwent ascension No. No. 85-095264, has proposed impregnating adsorbent macroporous polymer based resins with complexing agents of the 7-alkenyl-8hydroxyquinoline group, demonstrating that it was possible to fix small quantities of gallium in solution on the stationary phase. The gallium is then eluted with conventional mineral acids. However, this patent remains silent about the capacities of these resins, more precisely in terms of the gallium batches which one can hope to fix. On the other hand, all the extraction tests described have been carried out on the basis of highly diluted sodium aluminate solution, excluding any direct application of the method to Bayer industrial liquors.

Quite recently, in a communication delivered to the I.S.E.C. in Munich, in September 1986, Cote and Bauer reported having carried out studies of various adsorbent resins sold under the generic name of AMBERLITE XAD (Amberlite XAD is a trade:mark of Rohm and Haas) impregnated with 7-(5,5,7,7-tetramethyl-oct-1-en-3-yl)-8-hydroxyquinoline sold under the trade name of "KELEX"(KELEX is a trademark of Ashland Chemical Co.) The effect of various parameters such as the quantity of extraction agent or complexing agent fixed onto the resin, the concentrations of gallium, aluminum and sodium hydroxide, the chemical nature of the adsorbent resin and the effect of additives likely to activate the kinetics were studied.

From these studies, it emerges that fixing capacities in excess of 3 grams of gallium per liter of resin have been obtained with semi-polar AMBERLITE XAD7 resin having an acrylic ester skeleton. But these fixing capacities were obtained with sodium aluminate solutions having gallium concentrations which were at least five times greater than those of industrial liquors. This excludes any possibility of applying the process to industrial liquors, their concentration of gallium, in any event, not being amenable to modification.

For Bauer and Cote, the chemical nature of the adsorbent resin was far more important than its texture (active surface measured by the BET method, porosity, pore size distribution), since the authors have came to a conclusion in favor of the superiority of the adsorbent resins with an aliphatic acrylic ester chain (AMBERLITE XAD7) over adsorbent resins with a polystyrene-type aromatic nucleus (AMBERLITE XAD2), which was reported to be unsuitable.

There is therefore a need for an industrial process for recovering gallium by directly passing Bayer liquor over a resin, which requires neither prior dilution nor concentration of the liquor, while ensuring the fixing of at least 3 grams of gallium per liter of resin without rapid degradation of the stationary phase.

SUMMARY OF THE INVENTION

Accordingly, it is an object of this invention to provide a novel process for recovering gallium from solutions containing this material.

It is another object of this invention to provide an efficient process for recovering gallium from solutions containing this material.

It is another object of this invention to provide a process for the efficient recovery of gallium from aqueous industrial liquors.

It is another object of this invention to provide a new process for the recovery of gallium from Bayer liquors.

It is another object of this invention to provide a process for recovering gallium from solutions containing this material, using a resin material.

It is another object of this invention to provide a process for the recovery of gallium contained in sodium aluminate solutions obtained from the Bayer process, using a resin material.

The inventor has now surprisingly discovered a process which satisfies all of the above objects of this invention, and other objects which will become apparent from a description of the invention given hereinbelow. This process provides the facile and efficient a recovery of gallium contained in an aqueous solution of sodium aluminate, which sodium aluminate solution can be heavily alkaline.

In this process a gallium-containing aqueous solution of sodium aluminate is contacted with a microporous impregnated adsorbent resin obtained by impregnating a resin with at least one 7-($C_{1-20}$ alkyl or $C_{1-20}$ alkenyl)-8-hydroxyquinoline. Contacting the gallium-containing aqueous solution of sodium aluminate with this resin results in fixing the gallium onto the resin, and as such the gallium can be recovered from the aqueous solution.

The resin used in the present invention must meet the following criteria, It must be a resin impregnated with at least one 7-($C_{1-20}$ alkyl or $C_{1-20}$-alkenyl)-8-hydroxyquinoline. Prior to impregnation, the dry resin must have a specific surface area, measured by the BET method, of at least 450 $m^2$ $g^{-1}$. It must have a pore volume of at least 1500 $mm^3$ $g^{-1}$, a mean pore diameter of between 80 and 500 Å, with at least 80% of the volume constituted by pores having a diameter between 40 and 5,000 Å. The rate of expansion or swelling of the resin in an aqueous medium must not exceed 20%. And it is impregnated with the 7-($C_{1-20}$ alkyl or $C_{1-20}$ alkenyl)-8-hydroxyquinoline in a portion of from 250 to 300 grams per liter of dry resin.

DETAILED DESCRIPTION OF THE PREFERRED EMBODIMENTS

In the present process, a 7-alkenyl-8-hydroxyquinoline can be used, for example 7-(5,5,7,7-tetramethyl-oct-1-en-3-yl)-8-hydroxyquinoline marketed under the name KELEX 100 can be used. This material can be used in a portion of from $5 \times 10^{-6}$ mole per square meter of dry resin to $15 \times 10^{-6}$ mole per square meter of dry resin.

The microporous adsorbent resin used can be a hydrophobic, non-polar resin having a polystyrene skeleton, for example the resin marketed under the name AMBERLITE XAD 1180 can be used.

The gallium-containing solution used in this process can be a strongly alkaline aqueous aluminate solution, such as the decomposed liquor obtained in the Bayer cycle following the aluminum hydroxide precipitation stage in this process. The aqueous solution of sodium aluminate drawn from the Bayer cycle can be used from a temperature between 40° C. and 60° C. It can have a free soda concentration of between 80 and 140 grams per liter, a concentration of dissolved $Al_2O_3$ of between 60 and 110 grams per liter in the solublized gallium concentration of between 150 and 300 mg per liter.

In an advantageous aspect of this invention, the process of the present invention includes the following stages. The resin is first preconditioned prior to impregnation (vide infra). The resin is then impregnated with KELEX 100 diluted in a solvent which is at least one member selected from the group consisting of solvents having at least one alcohol function. The gallium is then fixed onto the resin by passage of the sodium aluminum solution drawn from the Bayer cycle over the resin, followed by washing the resin with water. The resin is then eluted with a strong mineral acid and a concentration of at least equal to 1N, for example 1N to 18N. The strong mineral acid used can be any Bronsted acid, for example hydrochloric acid, nitric acid, sulfuric acid, etc.

The preconditioning of the resin can be carried by successively washing the resin with deionized water, followed by ethanol, which is then followed with 1N hydrochloric acid, and then exhaustive washing with water to the point of complete elimination of $Cl^-$ ions as determined by silver nitrate test. The resin is then dried in the oven at a temperature of about 110° C. until a constant is obtained.

The preconditioned resin is then impregnated with a solution containing a 7-($C_{1-20}$ alkyl or $C_{1-20}$ alkenyl)-8-hydroxyquinoline, such as for example KELEX 100, diluted in an amount of from 10 to 30% by wt. in an alcohol, for example, ethanol. This impregnation step is carried out so that after impregnation and drying in a vacuum to eliminate the solvent, the weight of quinoline compound impregnated onto the resin is between 230 and 700, preferably between 250 and 300 gram per liter of dry resin. After, the quinoline impregnated resin is then impregnated with deionized water and then degasified in a vacuum.

The gallium is then fixed onto the impregnated resin by passing the sodium aluminate solution containing gallium over the resin at temperature of from 40° to 60° C. and at an hourly rate of flow of from about 2 to about 10 times the amount of resin bed in the column. That is to say, the hourly flow rate of the sodium aluminate solution is such that the value of sodium aluminate solution exposed to the resin is 2 to 10 times the volume of the resin bed on a per hour basis.

After the gallium is fixed, the gallium-containing resin is washed with water and then eluted at ambient temperature, for example 15° C. to 35° C., by passage of an aqueous solution of a Bronsted acid, for example sulfuric acid, at a concentration of from 3N to 6N at a flow rate of 2 to 10 volumes of aqueous eluant per volume of resin per hour.

During tests to fix and then elute gallium over various adsorbent impregnated resins, the inventor discovered that an adsorbent resin having an aromatic polystyrene chain marketed under the name AMBERLITE XAD 1180 revealed itself to be markedly superior to conventional AMBERLITE XAD7 of the prior art and that certain physical characteristics hitherto neglected and relating particularly to the texture of the resin were determining factors in the resin's ability to extract gallium.

The invention provides a process for the recovery of the gallium contained in sodium aluminate solutions emanating from the Bayer process by exchange of chemical compound preparations between a stationary phase constituted by a macroporous adsorbent resin with a 7-alkenyl-8-hydroxyquinoline charge and the aqueous phase of sodium aluminate. Prior to impregnation the dry resin used has a specific surface area, BET, in excess of 450 sq.m per gram, a pore volume at least equal to 1500 cu.mm/gram of dry resin, a mean pore diameter of between 80 Å and 500 Å with at least 80% of the pore volume consisting of pores of a diameter comprised between 40 Å and 5000 Å, and an expansion rate in an aqueous medium not exceeding 20%. The resin is impregnated with at least one 7-($C_{1-20}$ alkyl or $C_{1-20}$ alkenyl)-8-hydroxyquinoline in a proportion of 250 to 350 grams per liter of dry resin.

The tests which led to the present invention were conducted in parallel using several types of impregnated resins using the same extraction agent, viz. KELEX 100 of the formula 7-(5,5,7,7-tetramethyl-oct-1-en-3-yl)-8-hydroxyquinoline.

It should be noted that the rate of impregnation by the extraction agent, which is preferably between 250 g/liter and 350 g/l of dry resin, may be expressed more accurately in moles per sq.m or moles per gram of dry carrier. Thus, in the case of a resin with a BET surface area of 650 sq.m/g and of which 1 liter weighs 230 g when in the dry state, this rate of impregnation varies from 5.38 to $10^{-6}$ moles per sq.m or 1.67 $10^{-3}$ g/sq.m to 7.53 $10^{-6}$ moles/sq.m or 2.34 $10^{-3}$ g/sq.m.

Four resins which are distinguished either by their chemical nature or by their texture were impregnated with KELEX 100, aiming at an impregnation rate of around 280 g/liter of dry resin considered as particularly favorable for the fixing of gallium on adsorbent resins with a BET surface area of nearly 500 sq.m/g.

AMBERLITE XAD 7 resin with an acrylic ester skeleton, already studied and considered by virtue of its both hydrophilic and hydrophobic character to be the most suitable carrier to favor adsorption, through its aliphatic chains, of the 7-substituted chain of KELEX molecules; with this combination the 8-hydroxyquinoline group of the molecule retains its entire mobility to fix the gallium in solution.

AMBERLITE XAD 1180 resin with a polystyrene skeleton of hydrophobic or non-polar character, heretofore considered, like the AMBERLITE XAD 2 resin, as not really suitable for the extraction of gallium by virtue of the inhibiting effect of the aromatic nuclei of these resins towards the 8-hydroxyquinoline group of KELEX 100. It was believed that the mobility of the 8-hydroxyquinoline is diminished vis-a-vis the gallium to be extracted from the alkaline aqueous solution.

DUOLITE S 861 resin of the same chemical nature as the AMBERLITE XAD 1180 resin but of a finer texture and a low porosity.

DUOLITE S 866 resin referred to as a "complexing agent" resulting from copolymerization of polystyrene and polyester and of a texture which is similar to that of S 861.

Table 1 below summarizes the main physico-chemical characteristics of these resins.

TABLE 1

| Resin | RESIN AMBERLITE XAD7 | AMBERLITE XAD1180 | DUOLITE S861 | DUOLITE S866 |
| --- | --- | --- | --- | --- |
| Chemical nature | Acrylic ester | Polystyrene | Polystyrene | "complex" |
| Property | hydrophilic hydrophobic | hydrophobic | hydrophobic | not specified |
| Pore volume cu · mm/gramme | 1200 | 1700 | 900 | 710 |
| Mean pore size Å | 80 Å | 120 Å | 28 Å | 28.5 Å |
| % volume of pores between 40 Å and 5000 Å | >80% | 70 and 80% | <70% | <60% |
| Specific BET surface area sq · m/g | 450 | 650 | 600 | 500 |
| Expansion rate % dry/wet | 69% | 11%* | 40% | 17% |

(*The Supplier's Technical Leaflet states <20%)

In this invention solutions drawn directly from the Bayer cycle following the stage in which the liquors supersaturated with sodium aluminate are decomposed to precipitate aluminum trihydroxide can be used. These have a free sodium hydroxide concentration of between 80 and 140 g/l, a concentration of soluble $Al_2O_3$ of between 60 and 110 g/l and a concentration of soluble gallium of between 150 and 350 mg/l. These solutions can be kept at a temperature of 40° to 60° C. while they are passed over the resin, in other words substantially the temperature at the end the decomposition stage. Thus, after fixing the gallium onto the resin these solutions may be reintroduced directly into the Bayer aluminum production cycle.

In the experiments performed by the inventor, the same solution used on the four previously characterized resins had the following composition:

caustic $Na_2O$: 163 g/l
$Al_2O_3$: 98.1 g/l
Ga: 240 mg/l.

Another object of the present invention is to provide a method of using these impregnated resins which makes it possible to compare their respective efficacy in the extraction of gallium and to choose the best performer for industrial application. This method is characterized by the following stages:

a) Preconditioning the resin followed by washings with deionized water, ethanol, 1N hydrochloric acid and then an exhaustive washing in water until there is complete elimination of the $Cl^-$ ions, verified by a test with $AgNO_3$ and drying an oven at 110° C. until the weight is constant. However, this stage is not necessary with XAD 1180 resin which is delivered dry.

b) Impregnation of the resin with a solution of KELEX 100 diluted in an alcohol, preferably ethanol, at the rate of approx. 15 to 30% by weight of KELEX 100 in the ethanol. This content is not critical. For practical reasons, it is best to be a little below the threshold of solubility of the KELEX in the alcohol, the quality of KELEX 100-ethanol solution being calculated in order to obtain the mass ratio of KELEX 100/volume of dry resin comprised between 250 and 350 g/l and more precisely, in the present case, 280 g/liter.

This impregnation phase may be carried out in one or a plurality of successive operations of impregnation with intermediate drying stages at 60° C. in a vacuum, making it possible to eliminate the ethanol and to monitor the quantity of KELEX 100 adsorbed. After a final drying in a vacuum the resin impregnated with KELEX 100 is impregnated with deionized water, degasified in a vacuum and then charged into a column.

c) The gallium is fixed onto the resin by passing the Bayer liquor maintained between 40° C. and 60° C. with a rate of flow of 2 to 10 B V per hour, that is to say an hourly rate of flow of two to ten times the corresponding volume of the resin bed in the column. (BV=bed volume).

In the present case, 1200 cc of decomposed Bayer liquor were passed over each resin in the course of four hours, in other words 300 cc/hr corresponding, according to the volume occupied by each resin in the column, to a range of fluctuation of 3.75 B V/hr to 6.4 B V/hr as indicated in Table 2.

d) After washing the resin with water, the fixed gallium is eluted with a strong mineral acid, preferably sulphuric acid in a concentration of between 3 N and 6 N and at ambient temperature with a rate of passage of 2 to 10 B V/hr. In the present case, only the AMBERLITE XAD 7 and AMBERLITE XAD 1180 resins having fixed gallium could be eluted with a solution of 4.5 N sulphuric acid with a rate of flow of 300 cc/hr representing successively rates of flow of 3.7 B V/hr and 6.4 B V/hr as indicated in Table 2 below.

It should be noted that:

a) During the fixing stage, monitoring of the contents in gallium was carried out at the intake and exit of the column and, during the elution stage, the same check was made at the exit from the column.

b) In the case of XAD 7 and XAD 1180 resins giving a positive result in the first fixing-elution cycle, two additional cycles were carried out to judge the stability of the results.

Therefore, in contrast to the teaching of the prior art, it emerges that from hydrophobic resin with a polystyrene skeleton such as AMBERLITE XAD 1180, it is possible to obtain excellent results in the fixing-elution of gallium since charges exceeding 4 g Ga per liter of resin were attained and this was a mean flux of fixed gallium close to 1 g/hr per liter of resin, performance figures which exceed those with conventional AMBERLITE XAD 7 resin with an acrylic ester skeleton and of a semi-polar nature. The result is that the characteristics which define the texture of the resins ought to be taken into account as a matter of priority when choosing an adsorbent resin for impregnation.

With reference to AMBERLITE XAD1180 resin, a high performance resin in the extraction of gallium from Bayer liquids is required to satisfy all the following conditions:

The pore volume per gram of dry resin (or the porosity) must be the highest possible and must be at least equal to 1500 cu.mm/g. But it must also be constituted for the most part of pores the size of which permits impregnation by the extraction agent, in this case KELEX 100. Thus, the pore diameters must not be too small, that is to say less than 40 Å, to ensure that the KELEX is capable of migrating into the pores and of impregnating their surface. But the pores must also not be too large, that is to say larger than 5000 Å, because in this case a pointlessly large volume of the resin only serves to allow the aqueous phase to circulate, the surface:volume ratio being too small for the complexing agent to be able to fix a significant quantity of gallium.

Within this range of pore diameters, comprised between 40 Å and 5000 Å, it is advantageous for resins with a pore volume >1500 cu.mm/g to have the largest possible active pore surface and of at least 450 sq.m/g

TABLE 2

| Test ref. | AMBERLITE XAD 7 GR 239 | DUOLITE S 861 RR 349 | DUOLITE S 866 RR 350 | AMBERLITE XAD 1180 RR 354 |
|---|---|---|---|---|
| Rate of impregnation in g of KELEX: | | | | |
| 1) per liter of dry resin | 282 | 287 | 280 | 275 |
| 2) per liter of resin in column | 247 | 275 | 243 | 245 |
| Volume and rate of flow of liquor at fixing | 15 BV at 3.7 BV/h | 27 BV at 6.8 BV/h | 24.6 BV at 6.1 BV/h | 25 BV at 6.4 BV/h |
| Peak volume and flow at elution | 1.1 BV at 3.7 BV/h | no elution | no elution | 1 BV at 6.4 BV/h |
| Gallium fixed g/l of resin in column- | 1.87 | 0 | 0 | 3.77 |
| dry - | 3.6 | | | 4.2 |
| delivered - | 1.6 | | | 4.2 |
| g/kg of KELEX | 12.7 | | | 15.4 |
| Mean flow of gallium fixed g/h/l of resin | 0.47 | 0 | 0 | 0.94 | on which the KELEX will be adsorbed, being impregnated at the rate of 250 g/liter to 350 g/liter of dry resin.

Finally, a last criterion must be taken into account, viz. the mean level of swelling or expansion of the dry resin when it is brought into contact with an aqueous medium. It must not exceed 20% because the less the cross-linked resin system is disturbed, the less great will be the deformation of the pores and channels and the less the KELEX adsorption conditions will depart from the optimum defined on a basis of the characteristics of the dry resin.

Typical experiments on a pilot scale using AMBERLITE XAD 1180 resin impregnated with KELEX 100 for the extraction of gallium from Bayer liquors were carried out with a view to confirming the results of the comparative experiments involving the said resin which the three other resins, results which already fully meet the problem posed with regard to the capacity for extracting gallium at the rate of at least 2 g/liter of resin directly from Bayer liquors and without degradation of the stationary phase constituted by the impregnated resin.

Other features of the invention will become apparent in the course of the following descriptions of exemplary embodiments which are given for illustration of this invention and are not intended to be limiting thereof.

The process which is described below utilizes the properties of a new non-functional resin, AMBERLITE XAD 1180, as a carrier for a gallium complexing agent.

2.9 liters of AMBERLITE XAD 1180 resin were dried in an oven at 80° C. to a constant weight. The corresponding mass was 667 g. This resin was brought into contact with a solution of KELEX 100 in absolute ethanol, comprising 4520 g ethanol and 800 g KELEX 100 (in other words 15% by mass). The mixture obtained was subjected to a vacuum by a diaphragm pump to degasify the grains of resin and to cause the alcohol solution to penetrate, after which it was placed on a sand bath in order gently to evaporate the majority of the alcohol.

Drying was completed in an oven at 80° C. Then, the dry resin was weighed. The resultant mass, i.e., 1466 g, corresponded to the fixing of almost all the KELEX. The level of impregnation was therefore 275 g KELEX per liter of dry resin.

The resin impregnated with KELEX was rehydrated in the presence of water which had been deionized and debubbled in a vacuum, then placed in a column. The volume of resin in the column was 3.2 liters, the bed height being 30 cm. 80 l of decomposed ex-production Bayer liquor maintained at 40° C. were passed over the resin at the rate of 20 liters/hr.

When this operation had been completed, quantitative analysis showed that the gallium content had changed from 240 mg/l at the entrance to the column to 90 mg/l measured in relation to the mean liquor collected at the outlet. After the resin had been washed with 6 liters of water, a 4.3 N sulphuric acid solution was passed over the column at the rate of 20 l per hour for 30 minutes.

Quantitative analysis of samples regularly drawn from the outlet from the column showed a peak gallium concentration ranging over 3.2 liters with a maximum of 6.8 g/l Ga. The elution solution corresponding to this peak having been collected separately, its gallium content was measured and was equal to 3.75 g/l Ga, in other words 12 g of Ga in the volume of 3.2 liters in question. Therefore, the resin had fixed 12 g of gallium, in other words 3.75 g Ga per liter of resin in the column.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A process for the separation of gallium values from an aqueous solution of sodium aluminate comprised thereof, including (a) contacting said aqueous solution of sodium aluminate with a non-polar microporous adsorbent resin impregnated with a gallium extracting amount of a 7-($C_{1-20}$ alkyl or $C_{1-20}$ alkenyl)-8-hydroxyquinoline extractant, said microporous absorbent resin having a polystyrene skeleton and having, prior to impregnation thereof, a BET specific surface area in excess of 450 $m^2/g$, a pore volume of at least 1,500 $mm^3/g$, a mean pore diameter ranging from 80 Å to 500 Å, at least 80% of the pore volume thereof comprising pores having a diameter ranging from 40 Å to 5,000 Å and exhibiting a degree of expansion in an aqueous medium not in excess of 20%, whereby said gallium values are fixed to said impregnated adsorbent resin, and thence (b) eluting said gallium values from said adsorbent resin.

2. The process as defined by claim 1, said microporous adsorbent resin being impregnated with from 250 to 350 grams of said 7-($C_{1-20}$ alkyl or $C_{1-20}$ alkenyl)-8-hydroxyquinoline extractant per liter thereof.

3. The process as defined by claim 1, said aqueous solution of sodium aluminate comprising a Bayer process liquor.

4. The process as defined by claim 3, said Bayer process liquor having a concentration of free sodium hydroxide ranging from 80 to 140 grams per liter, a concentration of dissolved $Al_2O_3$ ranging from 60 to 110 grams per liter and a concentration of solubilized gallium ranging from 150 to 350 mg per liter.

5. The process as defined by claim 1, said microporous adsorbent resin being hydrophobic.

6. The process as defined by claim 1, said 7-($C_{1-20}$ alkyl or $C_{1-20}$ alkenyl)-8-hydroxyquinoline extractant comprising 7-(5,5,7,7-tetramethyl-oct-1-en-3-yl)-8-hydroxyquinoline.

7. The process as defined by claim 6, said microporous adsorbent resin being impregnated with from $5 \times 10^{-6}$ to $15 \times 10^{-6}$ mole of said 7-(5,5,7,7-tetramethyl-oct-1-en-3-yl)-8-hydroxyquinoline extractant per square meter thereof.

8. The process as defined by claim 1, carried out at a temperature ranging from 40° C. to 60° C.

9. The process as defined by claim 1, carried out such that the hourly rate of contacting of said aqueous solution of sodium aluminate ranges from 2 to 10 times the volume of said adsorbent resin.

10. The process as defined by claim 9, comprising fixing about 1 g/hr of gallium per liter of said adsorbent resin.

11. The process as defined by claim 4, comprising separating at least 2 grams of gallium per liter of adsorbent resin.

12. The process as defined by claim 1, comprising eluting said gallium values with a strong Brönsted acid.

13. The process as defined by claim 5, said microporous adsorbent resin having a crosslinked polystyrene skeleton.

14. The process as defined by claim 5, said microporous adsorbent resin being impregnated with from 250 to 350 grams of said 7-($C_{1-20}$ alkyl or $C_{1-20}$ alkenyl)-8-hydroxyquinoline extractant per liter thereof.

15. The process as defined by claim 5, said aqueous solution of sodium aluminate comprising a Bayer process liquor.

16. The process as defined by claim 15, said Bayer process liquor having a concentration of free sodium hydroxide ranging from 80 to 140 grams per liter, a concentration of dissolved $Al_2O_3$ ranging from 60 to 110 grams per liter and a concentration of solubilized gallium ranging from 150 to 350 mg per liter.

17. The process as defined by claim 16, comprising separating at least 2 grams of gallium per liter of adsorbent resin.

18. The process as defined by claim 5, said 7-($C_{1-20}$ alkyl or $C_{1-20}$ alkenyl)-8-hydroxyquinoline extractant comprising 7-(5,5,7,7-tetramethyl-oct-1-en-3-yl)-8-hydroxyquinoline.

19. The process as defined by claim 18, said microporous adsorbent resin being impregnated with from $5 \times 10^{-6}$ to $15 \times 10^{-6}$ mole of said 7-(5,5,7,7-tetramethyl-oct-1-en-3-yl)-8-hydroxyquinoline extractant per square meter thereof.

20. The process as defined by claim 5, carded out at a temperature ranging from 40° C. to 60° C.

21. The process as defined by claim 5, carried out such that the hourly rate of contacting of said aqueous solution of sodium aluminate ranges from 2 to 10 times the volume of said adsorbent resin.

22. The process as defined by claim 21, comprising fixing about 1 g/hr of gallium per liter of said adsorbent resin.

23. The process as defined by claim 5, comprising eluting said gallium values with a strong Brönsted acid.

* * * * *